United States Patent
Hafuka

(10) Patent No.: US 8,519,784 B2
(45) Date of Patent: Aug. 27, 2013

(54) FSK DEMODULATOR

(75) Inventor: Takamitsu Hafuka, Tokyo (JP)

(73) Assignee: Lapis Semiconductor Co., Ltd. (JP)

( * ) Notice: Subject to any disclaimer, the term of this patent is extended or adjusted under 35 U.S.C. 154(b) by 16 days.

(21) Appl. No.: 13/398,758

(22) Filed: Feb. 16, 2012

(65) Prior Publication Data

US 2012/0212290 A1    Aug. 23, 2012

(30) Foreign Application Priority Data

Feb. 18, 2011   (JP) ................................ 2011-033875

(51) Int. Cl.
*H03D 3/00* (2006.01)
*H04L 27/14* (2006.01)

(52) U.S. Cl.
USPC .......................................... 329/303; 375/334

(58) Field of Classification Search
USPC ......................................... 329/303; 375/334
See application file for complete search history.

(56) References Cited

U.S. PATENT DOCUMENTS

| | | | | |
|---|---|---|---|---|
| 5,818,296 A | * | 10/1998 | Lee et al. | 329/300 |
| 7,664,205 B2 | * | 2/2010 | Wang et al. | 375/334 |
| 7,715,500 B2 | * | 5/2010 | Akahori | 375/334 |
| 8,199,860 B2 | * | 6/2012 | Yamada | 375/326 |

FOREIGN PATENT DOCUMENTS

JP    2006-325127 A    11/2006

* cited by examiner

*Primary Examiner* — Joseph Chang
(74) *Attorney, Agent, or Firm* — Studebaker & Brackett PC

(57) ABSTRACT

An FSK demodulator and a method for detecting an inflection point extract a greater amount of effective inflection points of a frequency detection signal while reducing erroneous detection of the inflection points. The inflection point detector includes an inflection point extraction part to extract the inflection point corresponding to variation of a sample value of an amplitude value of the frequency detection signal, an amplitude determination part to determine if a size between peak values of sample values in front and rear of the inflection point exists in a first predetermined range, a preamble determination part to determine if a difference between initial and final sample values of at least one of a symbol having the extracted inflection point and a right before symbol exists in a second predetermined range, and an AND operation part to determine a normal inflection point.

12 Claims, 6 Drawing Sheets

FSK DEMODULATOR

BACKGROUND OF THE INVENTION

1. Technical Field

The present invention relates to an FSK (Frequency Shift Keying) receiver. More particularly, the present invention relates to an FSK demodulator of an FSK receiver.

2. Description of the Related Art

In general, as shown in FIG. 1, an FSK demodulator constituting a FSK receiver according to the related art includes a frequency detector 11, a frequency offset cancellation circuit 12, and a symbol timing regenerator 13. The frequency detector 11 converts frequency shift information of an FSK-modulated wave of a received IF signal into an amplitude value to generate a frequency detection signal. The frequency offset cancellation circuit 12 cancels frequency offset components, which are generated due to frequency errors between local oscillators of a transmitter and a receiver, from the frequency detection signal. The symbol timing regenerator 13 generates the optimal symbol timing based on a detection signal and performs data decision based on a detection signal obtained after the frequency offset components have been cancelled from the frequency detection signal.

According to one scheme to realize the frequency offset cancellation circuit 12, frequency offset components are calculated by extracting points (inflection points), at which the second derivative of a frequency detection waveform is zero, from the frequency detection waveform, and averaging the points (see Patent Literature 1).

When the frequency offset cancellation circuit 12 employs the above scheme of extracting the inflection points, the frequency offset cancellation circuit 12 may include, for example, an inflection point detector 21, an averaging circuit 22, and a subtraction circuit 23 as shown in FIG. 2. The inflection point detector 21 receives a frequency detection signal S0 which is an output signal of the frequency detector 11 to generate inflection point timings of the frequency detection signal S0. The averaging circuit 22 averages amplitude values of the inflection point timings which are output from the inflection point detector 21. The subtraction circuit 23 subtracts the average amplitude information (frequency offset signal) of the inflection point timings, which is an output signal of the averaging circuit 22, from the output signal of the frequency detector 11 to generate a frequency detection signal after the frequency offset components are canceled.

For example, the inflection point detector 21 has a structure shown in FIG. 3. The inflection point detector 21 of FIG. 3 has a circuit structure of detecting inflection points at an operating clock rate which is 16 times greater than a symbol rate. The inflection point detector 21 includes a 16-stage shift register 31 to store sample values corresponding to amplitude values of the frequency detection signal S0 for one symbol after sampling the frequency detection signal S0 according to the operating clock, a subtracter C1 to subtract a first output of the 16-stage shift register 31 from an eighth output of the 16-stage shift register 31, a subtracter C2 to subtract a ninth output of the 16-stage shift register 31 from a 16th output of the 16-stage shift register 31, a subtracter C3 to perform subtraction with respect to outputs of the subtracters C1 and C2, a subtracter C4 to subtract the first output of the 16-stage shift register 31 from the 16th output of the 16-stage shift register 31, an absolute value circuit C5 to calculate an absolute value of an output of the subtracter C3, an absolute value circuit C6 to calculate an absolute value of an output of the subtracter C4, a comparator C7 to compare an output value of the absolute value circuit C5 with threshold values A and B in size, a comparator C8 to compare an output value of the absolute value circuit C6 with a threshold value C in size, an AND circuit C9 to perform an AND operation with respect to outputs of the comparators C7 and C8, an edge detector C10 to detect the rising edge of an output of the AND circuit C9, and a pre-frequency offset generator C11 to extract a frequency detection value at the inflection point timing from an inflection point timing signal, which is an output of the edge detector C10, and the output signal of the frequency detector 11. In addition, the subtracters C1 to C3, the absolute value circuit C6, and the comparator C8 constitute an inflection point extraction circuit 32, and the subtracter C4, the absolute value circuit C5, and the comparator C7 constitute an amplitude monitoring circuit 33.

In the inflection point detector 21 having the above structure, the levels of the input frequency detection signal S0 are shifted from a first shift register to a 16th shift register one by one in synchronization with the operating clock of the 16-shift register 31 while the levels of the input frequency detection signal S0 are being retained in the 16-stage shift register 31. In this case, the first output to the 16th output of the 16-stage shift register 31 for the frequency detection signal S0 having the waveform of FIG. 4 have signal levels as shown in FIG. 4. In the inflection point extraction circuit 32, an operation result S1 of the subtracter C1 and an operation result S2 of the subtracter C2 are obtained as "b−a" and "d−c", and the gradient of the frequency detection signal S0 at the duration corresponding to 8 operating clock pulses is calculated at each operating clock. In addition, the difference of the differential values (i.e., S2−S1=(d−c)−(b−a)) is made by the subtracter C3, and the absolute value (|(d−c)−(b−a)|) of the difference is calculated by the absolute value circuit C6. Since the difference of two differential values S2 and S1 correspond to the value of a second derivative, a point having a value less than or equal to the threshold C is regarded as an inflection point. Therefore, the inflection point can be obtained from the comparator C8.

In addition, in order to prevent inflection points from being erroneously detected due to noise, the amplitude monitoring circuit 33 is provided. The amplitude monitoring circuit 33 regards an amplitude S3 of the frequency detection signal S0 of the received IF signal as noise if the amplitude S3 (value between peaks) of the frequency detection signal S0 is greater than or equal to the threshold value A, or less than or equal to the threshold value B. An output representing the presence of noise is obtained from the comparator C7.

The AND circuit C9 negates an inflection point if the inflection point is detected by the inflection point extraction circuit 32 at the timing in which the amplitude S3 of the frequency detection signal S0 is regarded as noise due to the condition of S3≧A or S3≦CB. Meanwhile, the AND circuit C9 outputs an inflection point if the inflection point is detected by the inflection point extraction circuit 32 in the state that a condition of B<S3<A is satisfied.

An inflection point timing signal S4 is obtained by detecting the rising edge of the output of the AND circuit C9 in the edge detector C10. In addition, the pre-frequency offset generator C11 extracts the center value of the frequency detection signal S0 from the inflection point timing signal S4 and generates a pre-frequency offset signal by using the center value. A final frequency offset signal representing offset components is calculated by performing an averaging operation with respect to the pre-frequency offset signal by the averaging circuit 22 provided at a next stage.

Patent Literature 1: Japanese Patent Kokai No. 2006-325127

SUMMARY OF THE INVENTION

Technical Problem

However, in the FSK demodulator of the FSK receiver according to the related art, inflection points may be erroneously detected when noise is received or under a low C/N environment. In other words, the effectiveness of an inflection point is determined by determining if the size S3 between peak values d and a of the frequency detection signal S0 is in the predetermined range (range formed by thresholds A and B). Accordingly, if the allowable range of the size S3 is widened in order to detect effective inflection points with noise, a number of inflection points caused by noise are extracted in proportion to the enlarged degree of the range, so that the erroneous detection of inflection points may occur. Therefore, frequency detection values at inflection point timings that have been erroneously detected, so that frequency offset values out of the expected value are calculated. Since the change of a frequency offset value from the expected frequency offset value exerts serious influence upon a receive characteristic (at least receive sensitivity), it is necessary to reduce the erroneous detection, such as an error regarding noise as inflection points.

Accordingly, the present invention has been made in view of the above problems occurring in the related art, and an object of the present invention is to provide an FSK demodulator and a method for detecting an inflection point, capable of extracting a greater amount of effective inflection points of the frequency detection signal while reducing the erroneous detection of the inflection point caused by the noise.

Solution to the Problem

In order to accomplish the object of the present invention, according to an aspect of the present invention, there is provided an FSK demodulator including a frequency detector to generate a frequency detection signal representing an amplitude value according to frequency shift of a received FSK modulation wave, a frequency offset cancellation part to cancel a frequency offset component from the frequency detection signal according to the frequency detection signal provided at a detection time point of an inflection point after detecting the inflection point of the frequency detection signal by an inflection point detector, and a data demodulation part to acquire demodulation data according to a frequency detection signal from which the frequency offset component is cancelled by the frequency offset cancellation part. The inflection point detector includes an inflection point extraction part to extract the inflection point according to variation of a sample value after sampling an amplitude value of the frequency detection signal at each predetermined operating clock, an amplitude determination part to determine if a size between peak values of sample values of the frequency detection signal, which are provided in front and rear of the inflection point extracted from the inflection point extraction part, is in a first predetermined range, a preamble determination part to determine if a difference between initial and final sample values of at least one of a symbol having the extracted inflection point and a symbol right before the symbol having the extracted inflection point is in a second predetermined range, and an AND gate part to determine the inflection point, which is extracted from the inflection point extraction part, as a normal inflection point if the amplitude determination part determines that the size between the peak values is in the first predetermined range, and if the preamble determination part determines that the difference between the initial and final sample values is in the second predetermined range.

According to another aspect of the present invention, there is provided a method for detecting an inflection point in an FSK demodulator including a frequency detector to generate a frequency detection signal representing an amplitude value according to frequency shift of a received FSK modulation wave, a frequency offset cancellation part to cancel a frequency offset component from the frequency detection signal according to the frequency detection signal provided at a detection time point of an inflection point after detecting the inflection point of the frequency detection signal, and a data demodulation part to acquire demodulation data according to a frequency detection signal from which the frequency offset component is cancelled by the frequency offset cancellation part. The method includes an inflection point extraction step to extract the inflection point according to variation of a sample value after sampling an amplitude value of the frequency detection signal at each predetermined operating clock, an amplitude determination step to determine if a size between peak values of sample values of the frequency detection signal, which are provided in front and rear of the inflection point extracted from the inflection point extraction step, is in a first predetermined range, a preamble determination step to determine if a difference between initial and final sample values of at least one of a symbol having the extracted inflection point and a symbol right before the symbol having the extracted inflection point is in a second predetermined range, and an AND operation step to determine the inflection point, which is extracted in the inflection point extraction step, as a normal inflection point if existence of the size between the peak values in the first predetermined range is determined in the amplitude determination step, and if existence of the difference between the initial and final sample values in the second predetermined range is determined in the preamble determination step.

Advantageous Effects

As described above, according to the FSK demodulator and the method for detecting the inflection point, it is determined that the difference between initial and final sample values of at least one of both a symbol having an extracted inflection point and a symbol right before the symbol having the inflection point is in the second predetermined range, thereby determining a preamble pattern. Accordingly, even if the allowable range of the first predetermined range used to extract the inflection point of the frequency detection signal is widened, the erroneous detection of the inflection point caused by noise frequency can be blocked. Therefore, a greater amount of inflection points of the frequency detection signal can be extracted while reducing the extraction of the inflection points caused by pure noise.

DETAILED DESCRIPTION OF THE EMBODIMENTS

Hereinafter, embodiments of the present invention will be described in detail with reference to accompanying drawings.

Figure 5:
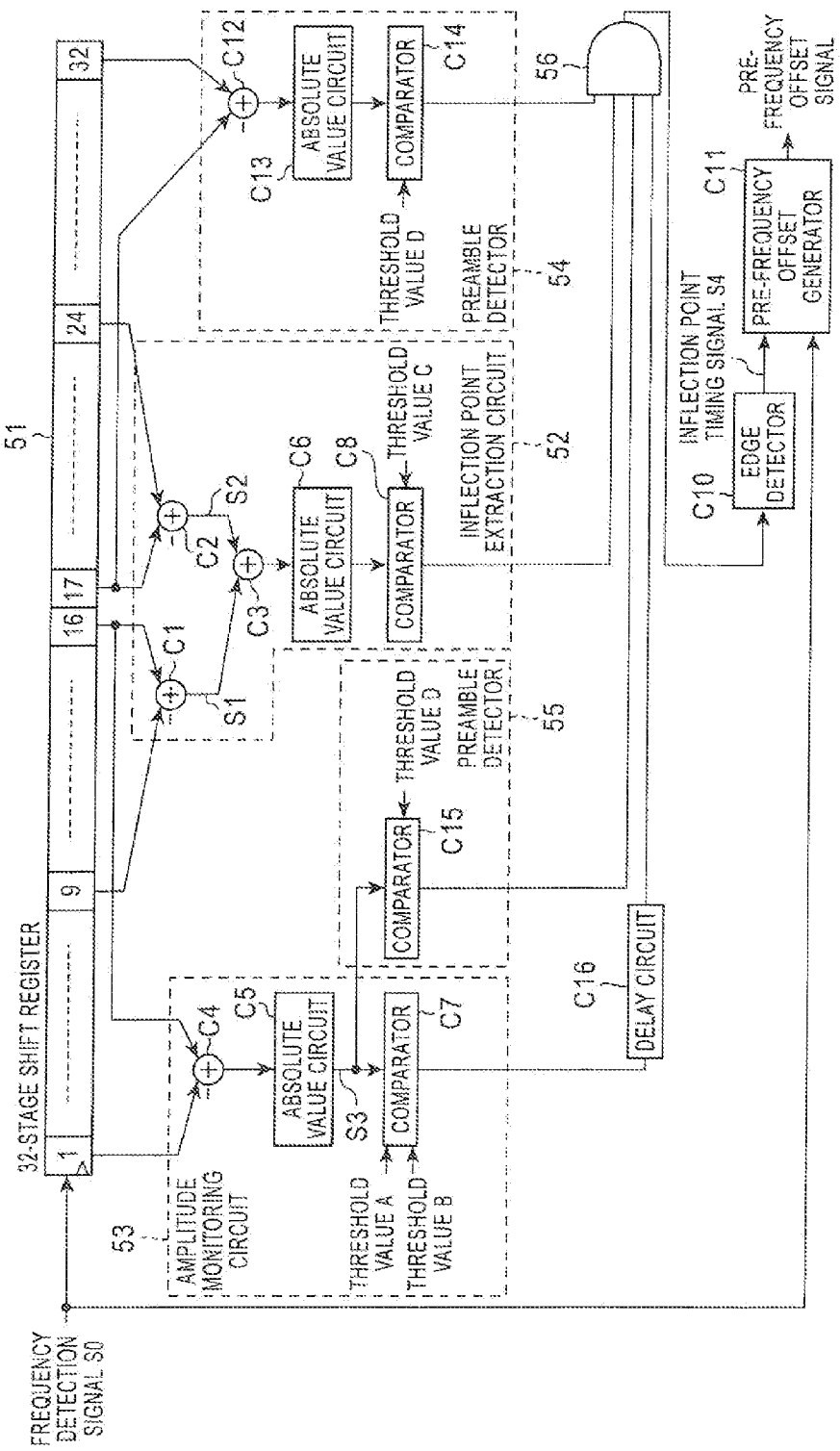
FIG. 5 is a block diagram schematically showing the structure of an inflection point detector according to a first embodiment of the present invention.

FIG. 5 is a block diagram showing the structure of an inflector point detector applied to an FSK demodulator according to a first embodiment of the present invention. The inflection point detector includes a 32-stage shift register 51, an inflection point extraction circuit 52, an amplitude monitoring circuit 53, preamble detectors 54 and 55, an AND gate 56, an edge detector C10, a pre-frequency offset generator C11, and a delay circuit C16.

The 32-stage shift register 51 retains sample values corresponding to amplitude values of a frequency detection signal S0 by two symbols after sampling the frequency detection signal S0 at an operating clock rate that is 16 times greater than a symbol rate. In addition, as shown in FIG. 5, the 32-stage shift register 51 has retained-outputs of a first shift register or a 32th shift register. The 32-stage shift register 51 outputs sample values of the frequency detection signal S0, which are sequentially input from the first shift register, while retaining the sample values. In addition, the sampling rate is not limited to 16 times greater than the symbol rate. For example, the sampling rate may be 32 times greater than the symbol rate. If the sampling rate is 32 times greater than the symbol rate, the shift register 51 must have 64 stages. The inflection point extraction circuit 52 corresponds to an inflation point extraction part, and includes subtracters C1 to C3, an absolute value circuit C6, and a comparator C8 similarly to the structure of the inflection point extraction circuit 32 shown in FIG. 3. In this case, the subtracter C1 subtracts a ninth output of the 32-stage shift register 51 from a 16th output of the 32-stage shift register 51, and the subtracter C2 subtracts a 17th output of the 32-stage shift register 51 from a 24th output of the 32-stage shift register 51.

Figure 3:
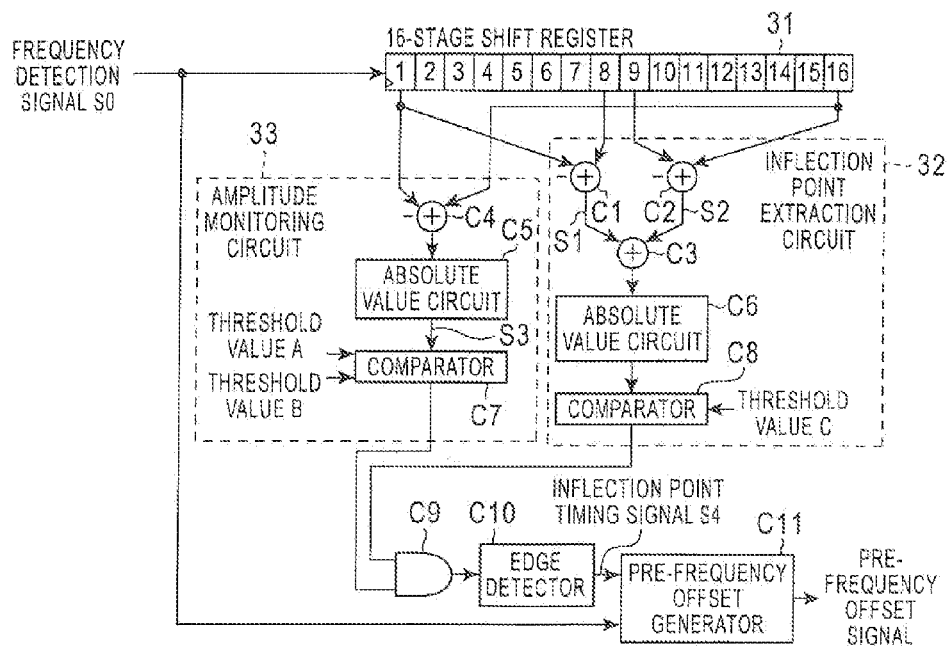
FIG. 3 is a block diagram showing the structure of an inflection point detector provided in the frequency offset cancellation circuit of FIG. 2.
Figure 4:
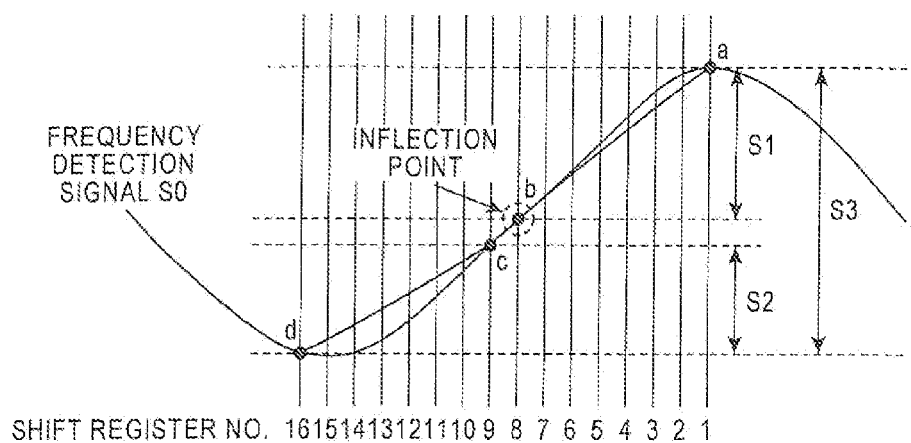
FIG. 4 is a view showing the relation between the frequency detection signal and inflection points.

The amplitude monitoring circuit 53 corresponds to an amplitude determination part, and includes a subtracter C4, an absolute value circuit C5, and a comparator C7 similarly to the structure of the amplitude monitoring circuit 33 shown in FIG. 3. The subtracter C4 subtracts a first output of the 32-stage shift register 51 from the 16th output of the 32-stage shift register 51.

The preamble detectors 54 and 55 correspond to a preamble determination part. The preamble detector 54 includes a subtracter C12, an absolute value circuit C13, and a comparator C14. The subtracter C12 subtracts the 17th output of the 32-stage shift register 51 from a 32th output of the 32-stage shift register 51. The abstract value circuit C13 calculates the absolute value of an output of the subtracter C12. The comparator C14 compares an output of the absolute value C13 with a threshold D in size. The preamble detector 55 includes a comparator C15. The comparator C15 compares an output of the absolute value circuit C5 provided in the amplitude monitoring circuit 53 with a threshold value D in size. The delay circuit C16 delays an output of the comparator C7 provided in the amplitude monitoring circuit 53.

The AND gate 56 constitutes an AND gate part together with the delay circuit C16, and performs an AND operation with respect to outputs of the comparators C8, C14, and C15 and an output of the delay circuit C16.

The edge detector C10 and the pre-frequency offset generator C11 are the same as those of the inflection point detector shown in FIG. 3.

Figure 6:
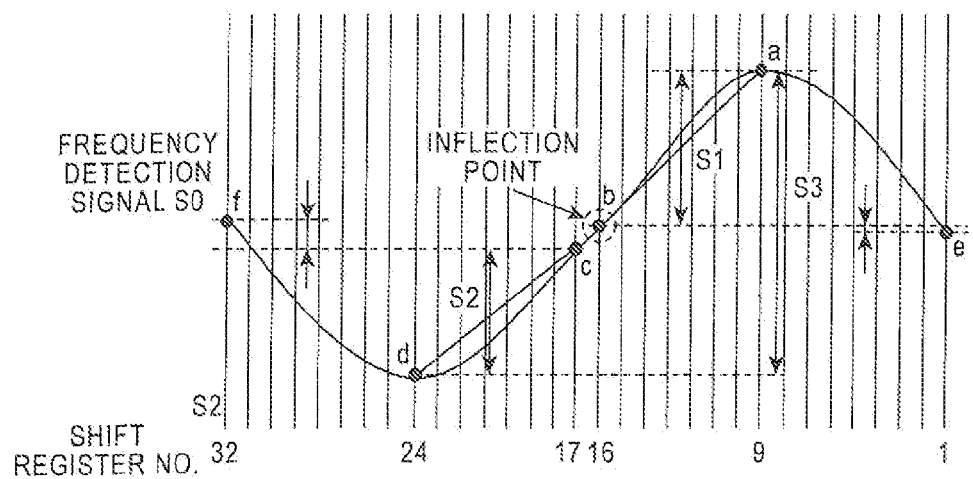
FIG. 6 is a view showing the relation between a frequency detection signal and inflection points in the inflection point detector of FIG. 5.

In the inflection point detector having the above structure, the levels of the input frequency detection signal S0 are shifted from the first shift register to the 32th shift register one by one while the levels of the input frequency detection signal S0 are being retained in the 32-stage shift register 51 in synchronization with the operating clock. In this case, the first output to the 32th output of the 32-stage shift register 51 for the frequency detection signal S0 having the waveform of FIG. 6 have signal levels as shown in FIG. 6.

In the inflection point extraction circuit 52, the operation results S1 and S2 of the subtracters C1 and C2 are obtained as "b−a" and "d−c", respectively, and the gradient of the frequency detection signal S0 at the duration corresponding to 8 operating clock pulses is calculated at each operating clock. In addition, the difference of the differential values (i.e., S2−S1=(d−c)−(b−a)) is made by the subtracter C3, and the absolute value (|(d−c)−(b−a|) of the difference is calculated by the absolute value circuit C6. Since the difference of two differential values S2 and S1 correspond to the value of a second derivative, a point having a value less than or equal to the threshold value C is regarded as an inflection point. Therefore, the inflection point can be obtained as a high (H) level value in the output of the comparator C8.

In a state that the operation result (S1=b−a) of the subtracter C1 and the operation result (S2=d−c) of the subtracter C2 are obtained in the inflection point extraction circuit 52, an operation result (b−e) is obtained from the subtracter C4 of the amplitude monitoring circuit 53. The output of the amplitude monitoring circuit 53 is delayed by 8 clock pulses through the timing adjustment of the delay circuit C16 and supplied to the AND gate 56. Therefore, since the amplitude monitoring circuit 53 at a time point earlier by 8 clock pulses calculates an operation result (a−d) through the subtracter C4, an amplitude S3 (value between peaks) of the frequency detection signal S0 of the received IF signal is obtained from the absolute value circuit C5. If the detected amplitude S3 is greater than or equal to the threshold value A or less than or equal to the threshold value B, the comparator C7 outputs a high (H) level value representing the presence of noise.

In addition, the output value (S3=|b−e|) of the absolute value circuit C5 is compared with the threshold value D in size by the comparator C15 of the preamble detector 55. If the output value (|b−e|) of the absolute value circuit C5 is less than or equal to the threshold value D, the comparator C15 generates an H level output.

In the preamble detector 54, the operation result (f−c) is calculated by the comparator C12. If an absolute value (|f−c|) output from the absolute value circuit C13 is less than or equal to the threshold value D, the comparator C14 generates an H level output.

The logical product for the output of the delay circuit 16 and the outputs of the comparators C18, C14, and C15 is found by the AND gate 56. A rising edge is detected from the edge detector C10 based on the output logical product. The rising edge becomes an inflection point timing signal S4, and is input to the pre-frequency offset generator C11. The pre-frequency offset generator C11 extracts frequency detection values serving as inflection points from the inflection point timing signal S4 and the frequency detection signal S0 and outputs the frequency detection values as a pre-frequency offset signal to the averaging circuit 22 placed at a next stage. The pre-frequency offset signal is averaged in the averaging circuit 22 to serve as a final frequency offset signal.

Figure 1:
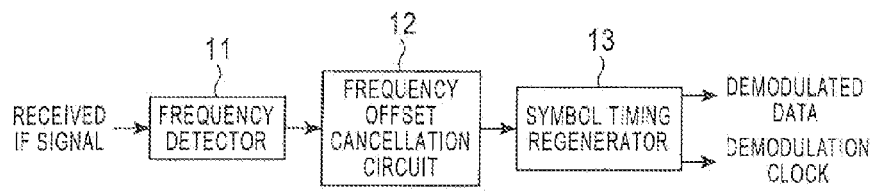
FIG. 1 is a block diagram schematically showing the structure of a conventional FSK demodulator.
Figure 2:
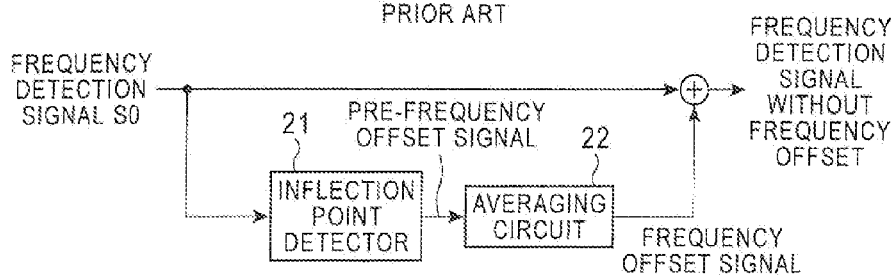
FIG. 2 is a block diagram showing the structure of a frequency offset cancellation circuit provided in a circuit of FIG. 1.

As described above, according to the first embodiment, an operation equivalent to an operation of monitoring a pattern of "1010" or "0101" is performed by applying conditions of "|b−e|≦threshold value D" and "|f−c|≦threshold value D" to the inflection point detector (see FIG. 3) according to the related art. This means that inflection points are monitored while monitoring the preamble pattern. Therefore, erroneous detection can be reduced, and the stability of frequency offset values can be improved by using an inflection point detector specialized for the preamble pattern. In addition, the preamble pattern can be monitored by constructing only the inflection point detector without using demodulation data and demodulation clock obtained from the symbol timing regenerator 13 of FIG. 1.

In addition, according to the first embodiment, since the satisfaction of conditions of "|b−e|≦threshold value D" and "|f−c|≦threshold value D" is detected, the inversion from a logic 1 value to a logic 0 value, or the inversion from a logic 0 value to a logic 1 value can be exactly determined in each of two consecutive symbols. Therefore, the preamble pattern can be exactly detected.

In addition, according to the present invention, only one of the two conditions of "|b−e|≦threshold value D" and "|f−c|≦threshold value D" may be satisfied, and the inversion of logical values can be detected before and after one symbol even if only one condition is satisfied. For example, when comparing with the inflection point detector of FIG. 3 according to the related art, a comparator to compare the output signal S3 of the absolute value circuit C5 with the threshold value D may be further installed, and an output signal of the comparator may be delayed in the delay circuit by 8 clock pulses, so that the output signal of the comparator may be supplied to the AND circuit C9 together with the outputs of the comparators C7 and C8.

Figure 7:
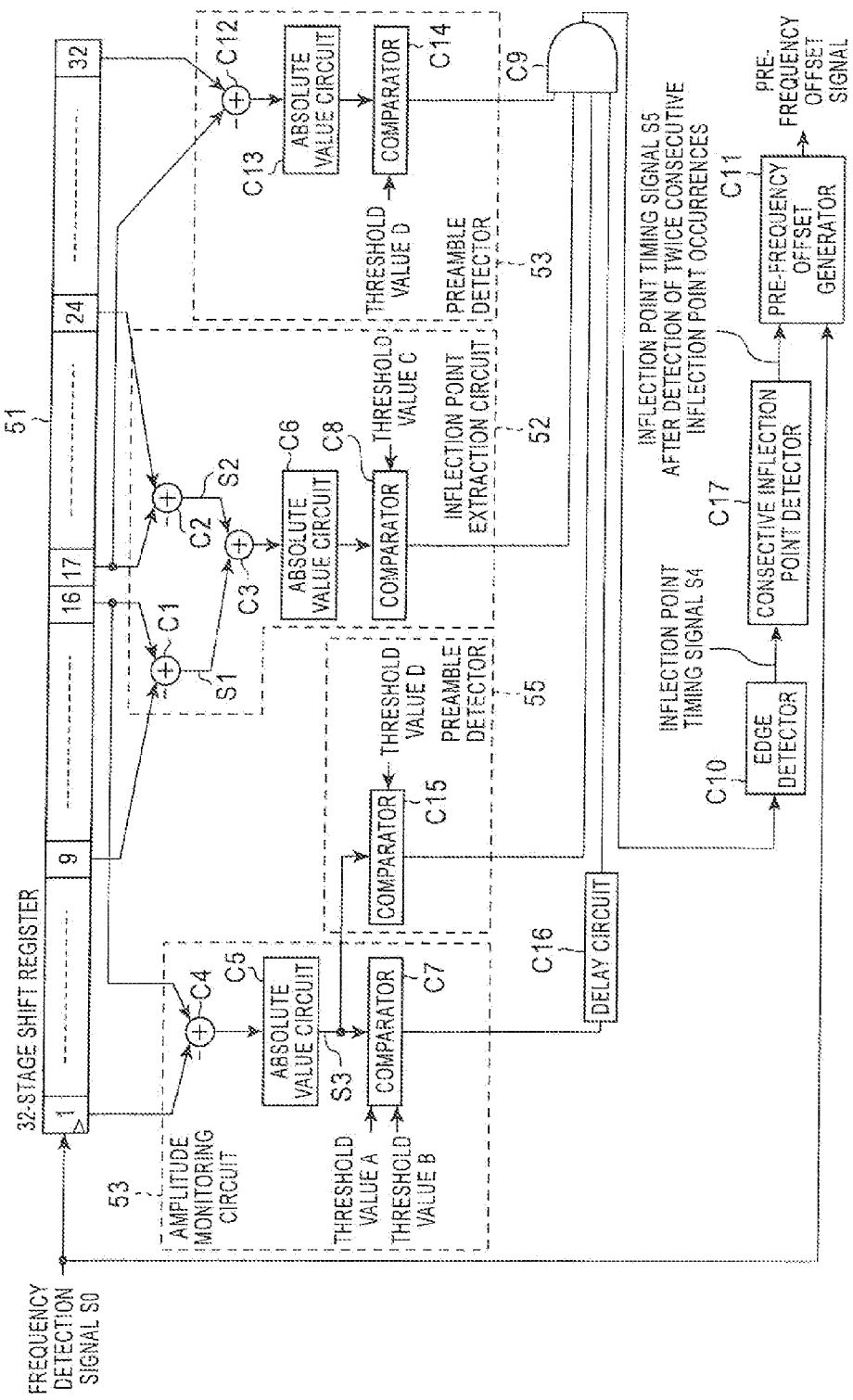
FIG. 7 is a block diagram schematically showing the structure of an inflection point detector according to a second embodiment of the present invention.

FIG. 7 is a block diagram showing the structure of an inflection point detector applied to an FSK demodulator according to a second embodiment of the present invention. The inflection point detector includes the 32-stage shift register 51, the inflection point extraction circuit 52, the amplitude monitoring circuit 53, the preamble detectors 54 and 55, the AND gate 56, the edge detector C10, the pre-frequency offset generator C11, and the delay circuit C16 similarly to the structure of the inflection point detector of FIG. 5, and further includes a consecutive inflection point generation detector C17.

The consecutive inflection point generation detector C17 is interposed between the edge detector C10 and the pre-frequency offset generator C11.

Figure 8:
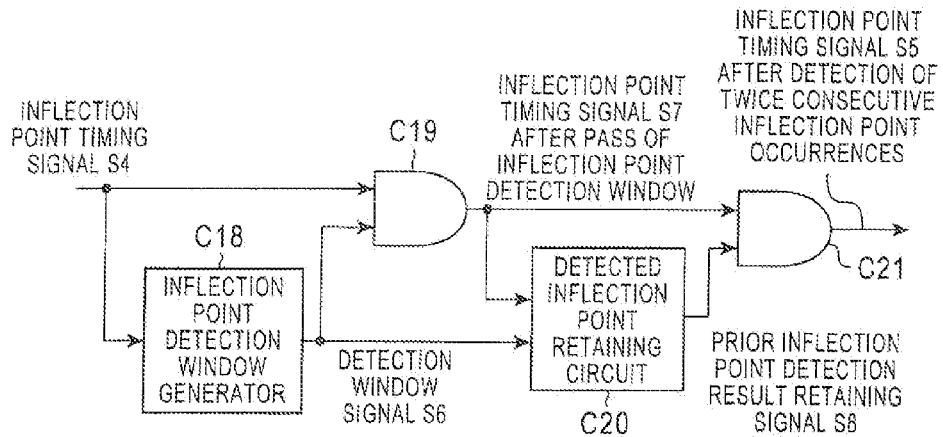
FIG. 8 is a block diagram showing the structure of a consecutive inflection point generation detector provided in the inflection point detector of FIG. 7.

As shown in FIG. 8, the consecutive inflection point generation detector C17 includes an inflection point detection window generator C18, an AND gate C19, a detected inflection point retaining circuit C20, and an AND circuit C21.

The inflection point detection window generator C18 receives the inflection point timing signal S4 from the edge detector C10 and generates an inflection point detection window at each symbol rate interval. The AND gate C19 performs an AND operation with respect to the inflection point timing signal S4 and a detection window signal S6, which is an output of the inflection point detection window generator C18, to generate an inflection point timing signal S7 after the pass of inflection point detection window.

The detected inflection point retaining circuit C20 receives the inflection point timing signal S7 after the pass of inflection point detection window which is an output of the AND gate C19, and the detection window signal S6 of the inflection point detection window generator C18 and retains the result about the detection state of the inflection point timing signal S4 for the H level duration of a prior detection window signal (detection window signal before one symbol). The AND circuit C21 performs an AND operation with respect to the output signal S7 of the AND gate C19 and a prior inflection point detection result retaining signal S8 which is an output of the detected inflection point retaining circuit C20 to generate an inflection point timing signal S5 after the detection of twice consecutive inflection point occurrences.

Other components of the second embodiment are the same as those of FIG. 5 according to the first embodiment. Accordingly, the operation of the inflection point detector until the output of the edge detector C10 and the operation of the inflection point detector after the pre-frequency offset generator are the same as the operations of the first embodiment.

Figure 9:
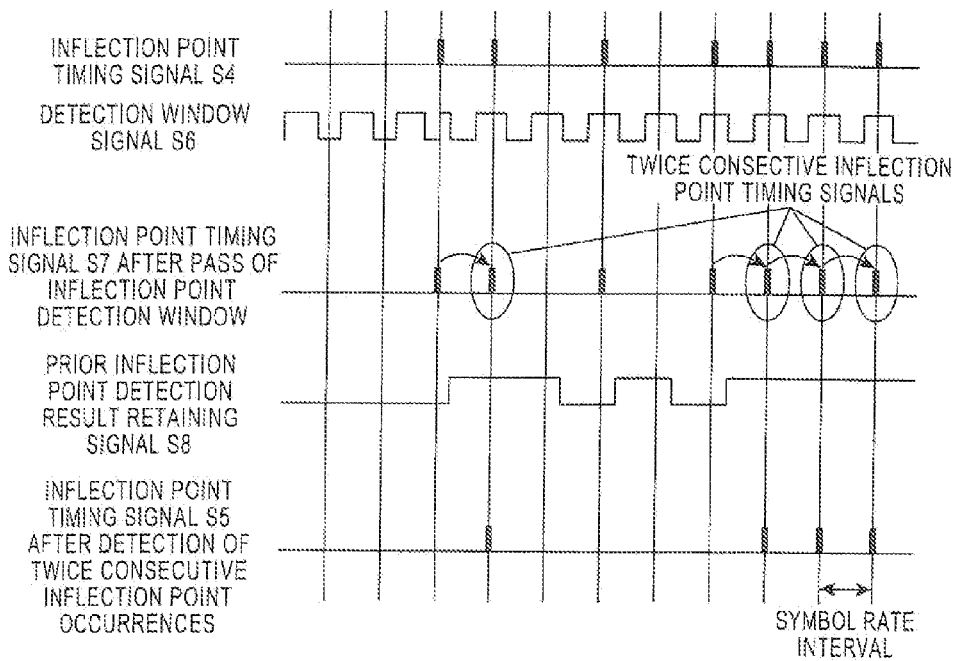
FIG. 9 is a timing chart showing the operation of the consecutive inflection point generation detector of FIG. 8.

Thereafter, the operation of the consecutive inflection point generation detector C17 will be described with reference to the timing chart shown in FIG. 9.

The inflection point detection window generator C18 generates the detection window signal S6 from the inflection point timing signal S4 which is an output of the edge detector C10. In this case, the detection window signal S6 has an H level with a predetermined period which corresponds to a symbol rate interval. The detection window signal S6 is regulated corresponding to the inflection point timing signal S4 in such a manner that the timing of the inflection point timing signal S4 at the H level occurs at the center of the H-level duration of the detection window signal S6. The inflection point timing signal S7 after the pass of inflection point detection window, which is output from the AND gate C19, is a signal obtained by AND-gating the inflection point timing signal S4 by the detection window signal S6.

At a falling edge timing of the detection window signal S6, the detected inflection point retaining circuit C20 determines if the inflection point timing signal S7 after the pass of inflection point detection window has been at the H level for the H-level duration of the detection window signal S6 right before the falling edge timing. If the inflection point timing signal S7 after the pass of inflection point detection window has been at the H level, the detected inflection point retaining circuit C20 outputs an H level signal. If the inflection point timing signal S7 after the pass of inflection point detection window has been at a low (L) level, the detected inflection point retaining circuit C20 outputs an L level signal. An output signal according to the determination result is supplied as the prior inflection point detection result retaining signal S8 to the AND circuit C21.

The AND circuit C21 generates the inflection point timing signal S5 after the detection of twice consecutive inflection point occurrences by gating the inflection point timing signal S7 after the pass of inflection point detection window by the prior inflection point detection result retaining signal S8. The inflection point timing signal S5 after the detection of twice consecutive inflection point occurrences is supplied to the pre-frequency offset generator C11 while serving as the consecutive inflection point generation detector C17.

The pre-frequency offset generator C11 extracts frequency detection values corresponding to inflation points from the inflection point timing signal S5 after twice consecutive inflection point occurrences detection and the frequency detection signal S0, and outputs the frequency detection values serving as the pre-frequency offset signal to the averaging circuit 22 provided at the next stage.

As described above, according to the second embodiment, since an inflection point timing signal is supplied to a pre-frequency offset generator only if an inflection point is detected in each of two consecutive symbols at a symbol rate, the possibility of detecting the inflection point in the middle of receiving an expected signal is high. In addition, as compared with the first embodiment, the erroneous detection of the inflection point caused by noise can be more reduced, the stability of the frequency offset value can be improved, and the receive characteristic can be improved.

Although the first and second embodiments have been described in that inflection points are detected by using the 32-stage shift register 51 to store frequency detection signals corresponding to two symbols, the length of a preamble pattern allowing pattern monitoring can be lengthened if the number of the stages of the shift register is increased. Accordingly, the erroneous detection of the inflection points can be reduced.

In addition, although the second embodiment has been described in that the consecutive inflection point generation detector consecutively detects inflection points twice, if the consecutive inflection point generation detector consecutively detects inflection points three times, erroneous detection can be more reduced.

In addition, although the hardware configuration of the inflection point detector is realized according to the above embodiments, the inflection points may be detected by performing an inflection point extracting step, an amplitude determining step, a preamble determining step, and an AND gating step through computer processing.

This application is based on Japanese Patent Application No. 2011-033875 which is incorporated herein by reference.

What is claimed is:

1. A Frequency Shift Keying (FSK) demodulator comprising:
a frequency detector to generate a frequency detection signal representing an amplitude value according to frequency shift of a received FSK modulation wave;
a frequency offset cancellation part to cancel a frequency offset component from the frequency detection signal according to the frequency detection signal provided at a detection time point of an inflection point after detecting the inflection point of the frequency detection signal by an inflection point detector; and
a data demodulation part to acquire demodulation data according to a frequency detection signal from which the frequency offset component is cancelled by the frequency offset cancellation part, and
wherein the inflection point detector comprises:
an inflection point extraction part to extract the inflection point according to variation of a sample value after sampling an amplitude value of the frequency detection signal at each predetermined operating clock;
an amplitude determination part to determine if a size between peak values of sample values of the frequency detection signal, which are provided in front and rear of the inflection point extracted from the inflection point extraction part, is in a first predetermined range;
a preamble determination part to determine if a difference between initial and final sample values of at least one of a symbol having the extracted inflection point and a symbol right before the symbol having the extracted inflection point is in a second predetermined range; and
an AND circuit part to determine the inflection point, which is extracted from the inflection point extraction part, as a normal inflection point if the amplitude determination part determines that the size between the peak values is in the first predetermined range, and if the preamble determination part determines that the difference between the initial and final sample values is in the second predetermined range.

2. The FSK demodulator of claim 1, wherein the inflection point extraction part includes a shift register to retain the amplitude value of the frequency detection signal corresponding to a plurality of symbols by sampling the amplitude value of the frequency detection signal according to the operating clock, calculates a quadratic differential value according to a plurality of sample values of the frequency detection signal corresponding to a first symbol, and extracts a sampling point, in which the quadratic differential value is less than or equal to a first threshold value, as the inflection point.

3. The FSK demodulator of claim 2, wherein the preamble determination part comprises: a first preamble determination part to determine if a first difference between a sample value of the extracted inflection point of a present symbol and a final sample value of the present symbol is in the second predetermined range; and a second preamble determination part to determine if a second difference between a sample value of the inflection point obtained from one-symbol before the present symbol and a sample value of the present symbol obtained right before the inflection point of the present symbol is in the second predetermined range, and
wherein the AND circuit part determines the inflection point, which is extracted from the inflection point extraction part, as a normal inflection point if the amplitude determination part determines that the size between the peak values is in the first predetermined range, the first preamble determination part determines that the first difference is in the second predetermined range, and the second preamble determination part determines that the second difference is in the second predetermined range.

4. The FSK demodulator of claim 1, wherein the preamble determination part determines that the difference between the initial and final stage values is in the second predetermined range when a logic representing the demodulation data is inverted at intervals of a symbol period.

5. The FSK demodulator of claim 2, wherein the shift register includes a 32-stage shift register,
the inflection point extraction point includes a first subtracter to subtract a ninth output of the 32-stage shift register from a $16^{th}$ output of the 32-stage shift register, a second subtracter to subtract a $17^{th}$ output of the 32-stage shift register from a $24^{th}$ output of the 32-stage shift register, a third subtracter to subtract an output of the first subtracter from an output of the second subtracter, a first absolute value circuit to calculate an absolute value of an output of the third subtracter, and a first comparator to compare the absolute value of the first absolute value circuit with the first threshold value in size,
the amplitude determination part includes a fourth subtracter to subtract a first output of the 32-stage shift register from the $16^{th}$ output of the 32-stage shift register, a second absolute value circuit to calculate an absolute value of an output of the fourth subtracter, and a second comparator to compare the absolute value of the second absolute value circuit with second and third threshold values forming the first predetermined range in size, the first preamble determination part includes a third comparator the absolute value of the second absolute value circuit with a fourth threshold value in size, the second preamble determination part includes a fifth subtracter to subtract the $17^{th}$ output of the 32-stage shift register from the $32^{th}$ output of the 32-stage shift register, a third absolute value circuit to calculate an absolute value of an output of the fifth subtracter, and a fourth comparator to compare the absolute value of the third absolute value circuit with the fourth threshold in size, and the AND gate part includes a delay circuit to delay an output of the second comparator by a time of the first symbol, and an AND gate circuit to calculate a logical product of an output of the first comparator, an output of the third comparator, an output of the fourth comparator, and an output of the delay circuit.

6. The FSK demodulator of claim 1, wherein the inflection point detector further comprises an edge detector to detect a rising edge of an output of the AND gate part and a pre-frequency offset generator to detect the amplitude value of the frequency detection signal at a timing of the rising edge detected by the edge detector and to output the detected amplitude value as a pre-frequency offset signal, and wherein the frequency offset cancellation part comprises an averaging circuit to generate a frequency offset signal by averaging the pre-frequency offset signal, and a subtraction circuit to subtract the frequency offset signal from the frequency detection signal and output a frequency detection signal without the frequency offset component.

7. The FSK demodulator of claim 2, wherein the inflection point detector further comprises an edge detector to detect a rising edge of an output of the AND gate part and a pre-frequency offset generator to detect the amplitude value of the frequency detection signal at a timing of the rising edge detected by the edge detector and to output the detected amplitude value as a pre-frequency offset signal, and wherein the frequency offset cancellation part comprises an averaging circuit to generate a frequency offset signal by averaging the pre-frequency offset signal, and a subtraction circuit to subtract the frequency offset signal from the frequency detection signal and output a frequency detection signal without the frequency offset component.

8. The FSK demodulator of claim 1, wherein the inflection point detector further comprises: an edge detector to detect a rising edge of an output of the AND gate part; a consecutive inflection point generation detector to detect that edges detected by the edge detector are consecutive in at least two symbols to output the detected edges; and a pre-frequency offset generator to detect amplitude values of the frequency detection signal at timings of the detected edges output from the consecutive inflection point generation detector and to output the amplitude values as a pre-frequency offset signal, and wherein the frequency offset cancellation part comprises an averaging part to generate a frequency offset signal by averaging the pre-frequency offset signal, and a subtraction circuit to subtract the frequency offset signal from the frequency detection signal and output a frequency detection signal without the frequency offset component.

9. The FSK demodulator of claim 2, wherein the inflection point detector further comprises: an edge detector to detect a rising edge of an output of the AND gate part; a consecutive inflection point generation detector to detect that edges detected by the edge detector are consecutive in at least two symbols to output the detected edges; and a pre-frequency offset generator to detect amplitude values of the frequency detection signal at timings of the detected edges output from the consecutive inflection point generation detector and to output the amplitude values as a pre-frequency offset signal, and wherein the frequency offset cancellation part comprises an averaging part to generate a frequency offset signal by averaging the pre-frequency offset signal, and a subtraction circuit to subtract the frequency offset signal from the frequency detection signal and output a frequency detection signal without the frequency offset component.

10. The FSK demodulator of claim 8, wherein the consecutive inflection point generation detector comprises:

an inflection point detection window generator to generate a detection window signal, which has a high level for a predetermined period so that a time point of each detected edge is positioned at a center of the high level, with a symbol period according to the edges of the edge detector;

a first AND gate circuit to perform an AND operation with respect to the detected edge of the edge detector and the detection window signal to generate an inflection point timing signal;

a detected inflection point retaining circuit to read the inflection point timing signal when the detection window single is at a high level and output a signal of maintaining a prior detection result of the inflection point at a falling edge from the high level of the detection window signal to a low level of the detection window signal; and a second AND gate circuit to detect that the edges detected by the edge detector are consecutive in at least two symbols by performing an AND operation with respect to the inflection point timing signal output from the first AND gate circuit and the signal of maintaining the prior detection result.

11. The FSK demodulator of claim 9, wherein the consecutive inflection point generation detector comprises:

an inflection point detection window generator to generate a detection window signal, which has a high level for a predetermined period so that a time point of each detected edge is positioned at a center of the high level, with a symbol period according to the edges of the edge detector;

a first AND gate circuit to perform an AND operation with respect to the detected edge of the edge detector and the detection window signal to generate an inflection point timing signal;

a detected inflection point retaining circuit to read the inflection point timing signal when the detection window single is at a high level and output a signal of maintaining a prior detection result of the inflection point at a falling edge from the high level of the detection window signal to a low level of the detection window signal; and a second AND gate circuit to detect that the edges detected by the edge detector are consecutive in at least two symbols by performing an AND operation with respect to the inflection point timing signal output from the first AND gate circuit and the signal of maintaining the prior detection result.

12. A method for detecting an inflection point in an FSK demodulator including a frequency detector to generate a frequency detection signal representing an amplitude value according to frequency shift of a received FSK modulation wave, a frequency offset cancellation part to cancel a frequency offset component from the frequency detection signal according to the frequency detection signal provided at a detection time point of an inflection point after detecting the inflection point of the frequency detection signal, and a data demodulation part to acquire demodulation data according to a frequency detection signal from which the frequency offset component is cancelled by the frequency offset cancellation part, wherein the method comprising:

an inflection point extraction step to extract the inflection point according to variation of a sample value after sampling an amplitude value of the frequency detection signal at each predetermined operating clock;

an amplitude determination step to determine if a size between peak values of sample values of the frequency detection signal, which are provided in front and rear of the inflection point extracted from the inflection point extraction step, is in a first predetermined range;

a preamble determination step to determine if a difference between initial and final sample values of at least one of a symbol having the extracted inflection point and a symbol right before the symbol having the extracted inflection point is in a second predetermined range; and an AND operation step to determine the inflection point, which is extracted in the inflection point extraction step, as a normal inflection point if existence of the size between the peak values in the first predetermined range is determined in the amplitude determination step, and if existence of the difference between the initial and final sample values in the second predetermined range is determined in the preamble determination step.

* * * * *